United States Patent [19]

Yagawa

[11] Patent Number: 5,003,846
[45] Date of Patent: Apr. 2, 1991

[54] OPTICAL FIBER CABLE-STRIPPING DEVICE

[75] Inventor: Hiroshi Yagawa, Tokyo, Japan
[73] Assignee: AMP Incorporated, Harrisburg, Pa.
[21] Appl. No.: 508,757
[22] Filed: Apr. 12, 1990

[30] Foreign Application Priority Data

Apr. 14, 1989 [JP] Japan .................................. 1-43867

[51] Int. Cl.$^5$ ............................................. H02G 1/12
[52] U.S. Cl. ...................................... 81/9.42; 30/90.6
[58] Field of Search ........................ 81/9.4, 9.41, 9.42; 30/90.1, 90.4, 90.6

[56] References Cited

U.S. PATENT DOCUMENTS

| | | | |
|---|---|---|---|
| 608,919 | 8/1898 | Sell | 30/90.6 |
| 1,354,365 | 9/1920 | Aaron | 30/90.6 |
| 2,523,936 | 9/1950 | Axelsen | 81/9.42 |
| 3,125,909 | 3/1964 | Hindenburg | 81/9.42 |
| 3,212,369 | 10/1965 | Way | 30/90.6 |
| 3,344,691 | 10/1967 | Staggs | 81/9.42 |

*Primary Examiner*—Roscoe V. Parker
*Attorney, Agent, or Firm*—Adrian J. LaRue; Allan B. Osborne

[57] ABSTRACT

A tool for stripping outer and inner jackets from an end of a transmission cable comprises upper and lower guide members (18, 19) normally spaced from each other defining an opening (23) therebetween and having first and second guide means (24, 26), cutting blade means (17a, 17b) mounted on the guide members and having first and second cutting sections (17c, 17d; 17e, 17f) aligned respectively with the first and second guide means (24, 26), a support surface (25) on one of the guide members (19) and a cutting member (20b) on the other guide member (18) in alignment with the support surface (25), operating means (11, 11a, 28) connected to the guide members (18, 19) to move them toward and away from each other when the cable is placed in the first guide means (24) so that the first cutting section (17c, 17d) cuts and strips an end of the outer jacket from the cable, then exposed fused ends of the inner jackets are placed on the support surface (25) so that the cutting member (20b) slits the fused inner jackets separating them whereafter the separated inner jackets are placed in the second guide means (26) so that the second cutting section (17e, 17f) cuts and strips ends of the inner jackets from the cable thereby exposing transmission members (2).

6 Claims, 5 Drawing Sheets

OPTICAL FIBER CABLE-STRIPPING DEVICE

FIELD OF THE INVENTION

This invention relates to an optical fiber cable stripping device which is a hand tool for stripping outer and inner jackets of an optical fiber cable comprising a plurality of parallel optical fibers, the inner jackets fused for bonding the optical fibers and the outer jacket for covering the inner jackets.

BACKGROUND OF THE INVENTION

As illustrated in FIG. 6A, the outer circumferences of optical fibers 2 to transmit optical signals are covered with fused inner jackets 3. An outer jacket 4 is provided to integrally cover the pair of optical fibers 2 to complete an optical fiber cable 1.

The outer jacket 4 and the inner jackets 3 of such optical fiber cable 1 are required to be stripped at an end 5 for mounting to a connector. Additionally, the fused inner jackets 3 of optical fibers 2 are slit to separate them at end 5 in order to adapt the pitch to the fibers of the connector.

Such operations are conventionally performed using separate tools. Choosing proper tools for different operations is time consuming and inefficient.

It is, therefore, desired to have a single tool capable of performing a series of different operations.

It is an object of this device to meet the needs by providing a single tool capable of stripping operations of an optical fiber such as removing the inner and outer jackets of such optical fiber cable, separating the inner jackets, thereby improving the operation efficiency.

SUMMARY OF THE INVENTION

The optical fiber cable stripping device according to the present invention is to be used on an optical fiber cable having a plurality of parallel optical fibers covered with mutually fused inner jackets and an outer jacket enclosing such inner jackets. The optical fiber cable stripping device or tool comprises a pair of levers to move toward each other for stripping the outer jacket at an end of the optical fiber cable, slitting the fused inner jackets, and stripping the inner jackets at the ends of the optical fibers. It further includes a pair of guides disposed at both sides of an opening for receiving the end of the optical fiber cable covered with the outer jacket. Also included is an outer jacket stripping section having a pair of cutting blades disposed along the guides to cut into the outer jacket Additionally included is an optical fiber separation section having a channel at one side of the opening to guide the end of the optical fiber cable inserted in the opening with the outer jacket being stripped by the outer jacket stripping section and a cutter disposed in the channel opposed to the other side of the opening for cutting into the fused inner jackets. Also further included is an inner jackets stripping section comprising a guide for each inner-jacketed optical fiber disposed at both sides of the opening for positioning the ends of the optical fibers inserted in the opening with the outer jacket at the end being stripped, a cutting blade for each inner-jacketed optical fiber disposed along each guide to cut into the respective inner jacket, and a stopper plate against which the end surface of each optical fiber abuts for longitudinally positioning each inner-jacketed optical fiber. Lastly, a cable holddown section is included to hold down the end of the cable during the stripping operation to remove the outer and inner jackets.

Since the present device is constructed as mentioned hereinbefore, the cutting blades cut into the inner jackets or the outer jacket at a predetermined location by simply gripping the handles of the stripping tool when stripping the inner jackets or the outer jacket or separating the optical fibers. The inner jackets or the outer jacket may be stripped automatically because the end of the optical fiber cable is held and the fused inner jackets are separated subsequent to the cutting for stripping of the outer jacket whereafter the inner jackets are stipped. Additionally, the cutting blade cuts into the fused inner jackets in separating the optical fibers, thereby separating the optical fibers by manually pulling the optical fiber cable relative to the tool.

BRIEF DESCRIPTION OF THE DRAWINGS

One embodiment of the optical fiber cable stripping tool according to present invention will be described in detail by way of example with reference to the accompanying drawings.

DETAILED DESCRIPTION OF THE INVENTION

Figures 6A, 6B, 6C, 6D:
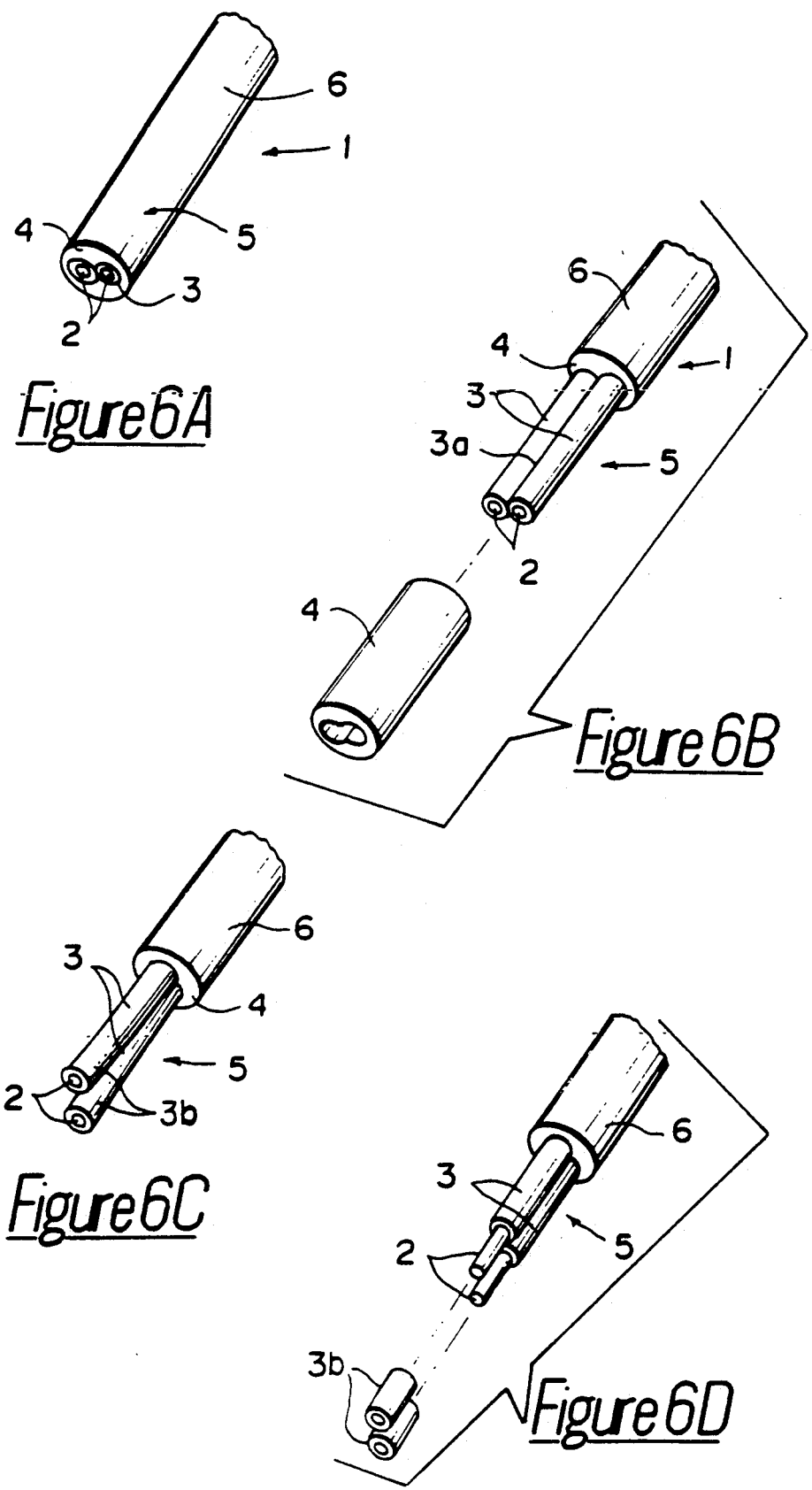
FIGS. 6A through 6D are perspective views illustrating the steps of stripping an end of the optical fiber cable.

The optical fiber cable 1 as illustrated in FIG. 6A comprises two parallel optical fibers 2. As illustrated in FIGS. 6B through 6D, the outer jacket 4 is stripped from the end 5 (see FIG. 6B). The two optical fibers 2 covered with inner jackets 3 are separated by slitting the fused section 3a of the inner jackets 3 (see FIG. 6C). Subsequently, ends 3b of the inner jackets 3 of the optical fibers 2 are stripped (FIG. 6D) before being connected to a connector.

Figure 1:
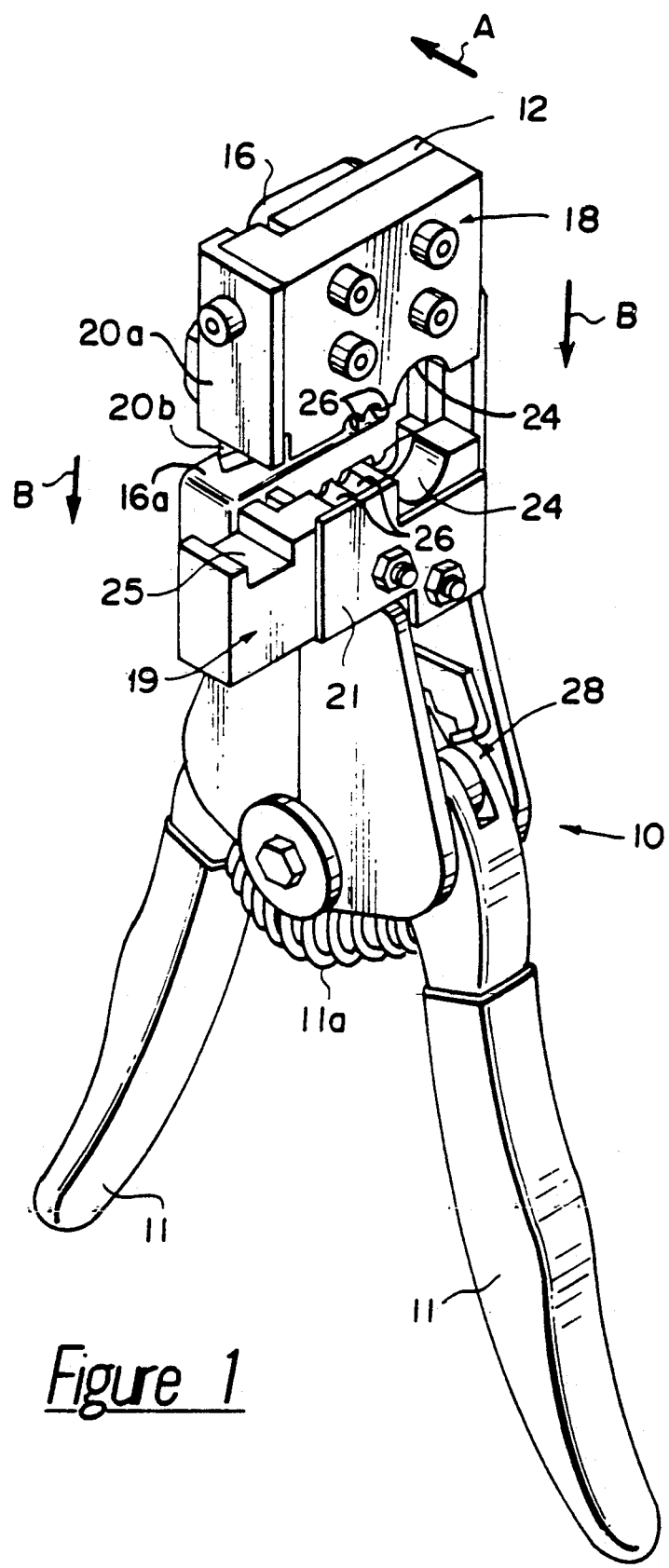
FIG. 1 is a perspective view of one embodiment of the optical fiber cable stripping tool according to the present invention.

A series of such stripping operations of the optical fiber cable are made using an optical fiber cable stripping tool 10, as illustrated in FIG. 1. This stripping tool 10 is designed to actuate a mechanism 28 by moving a pair of handles 11 toward each other against the spring action of a spring member 11a. Such an operation effects stripping an end of the outer jacket 4 from the optical fiber cable 1, separation of the two fused optical fibers 2, and stripping ends of the separated inner jackets 3.

The construction of the stripping tool 10 will be described hereunder by reference to FIGS. 2 and 3.

Figure 2:
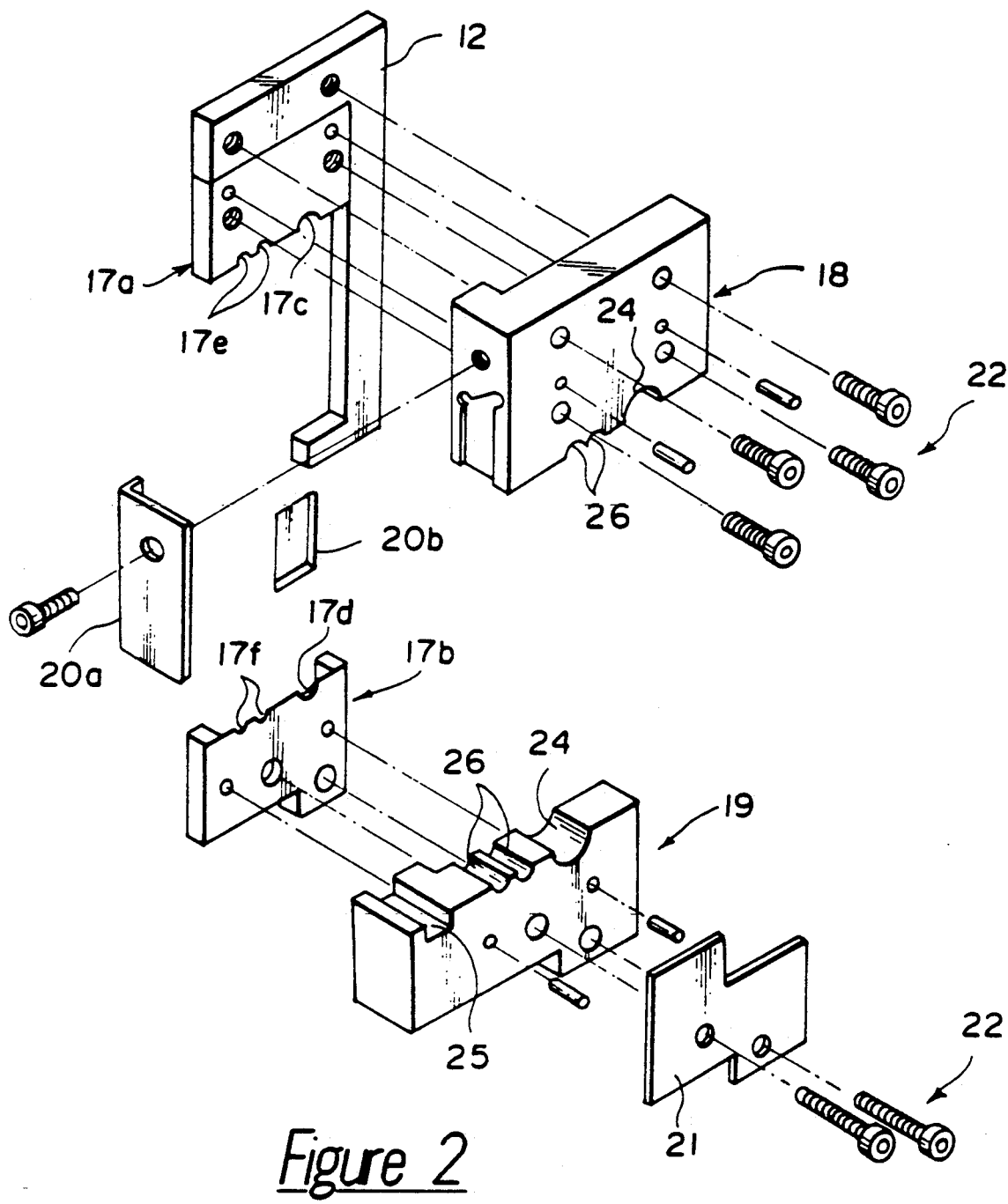
FIG. 2 is an exploded perspective view of important parts of the embodiment in FIG. 1.

Illustrated in FIG. 2 is a detailed construction of an outer jacket stripping section 13, an optical fiber separation section 14 and an inner jacket stripping section 15 to achieve stripping and separation as mentioned above. Assembled by bolts 22 are such members as an upper blade retention member 12, an upper cutting blade 17a having a cutter section 17c for the outer jacket and cutter sections 17e for the inner jackets; an upper guide member 18; a lower guide member 19; a lower cutting blade 17b mounted on the lower guide member 19 thereby forming a pair of cutting blades with the upper blade 17a; a cutting blade 20b to be mounted in a recess at the side of the upper guide member 18 by a support member 20a; and a stopper plate 21 to be mounted on the lower guide member 19.

The upper guide member 18 is disposed above the lower guide member 19 by leaving an opening 23 therebetween in such a manner that the upper guide member 18 moves downwardly against the lower guide member 19. The outer jacket stripping section 13 and the inner jackets stripping section 15 are formed by movement of the guide members 18,19 relative to one another in the direction shown by an arrow B. Such movement is effected by operating the handles 11. Sections 16,16a form a cable hold-down section for holding down the cable during the operation of the tool.

Figure 3:
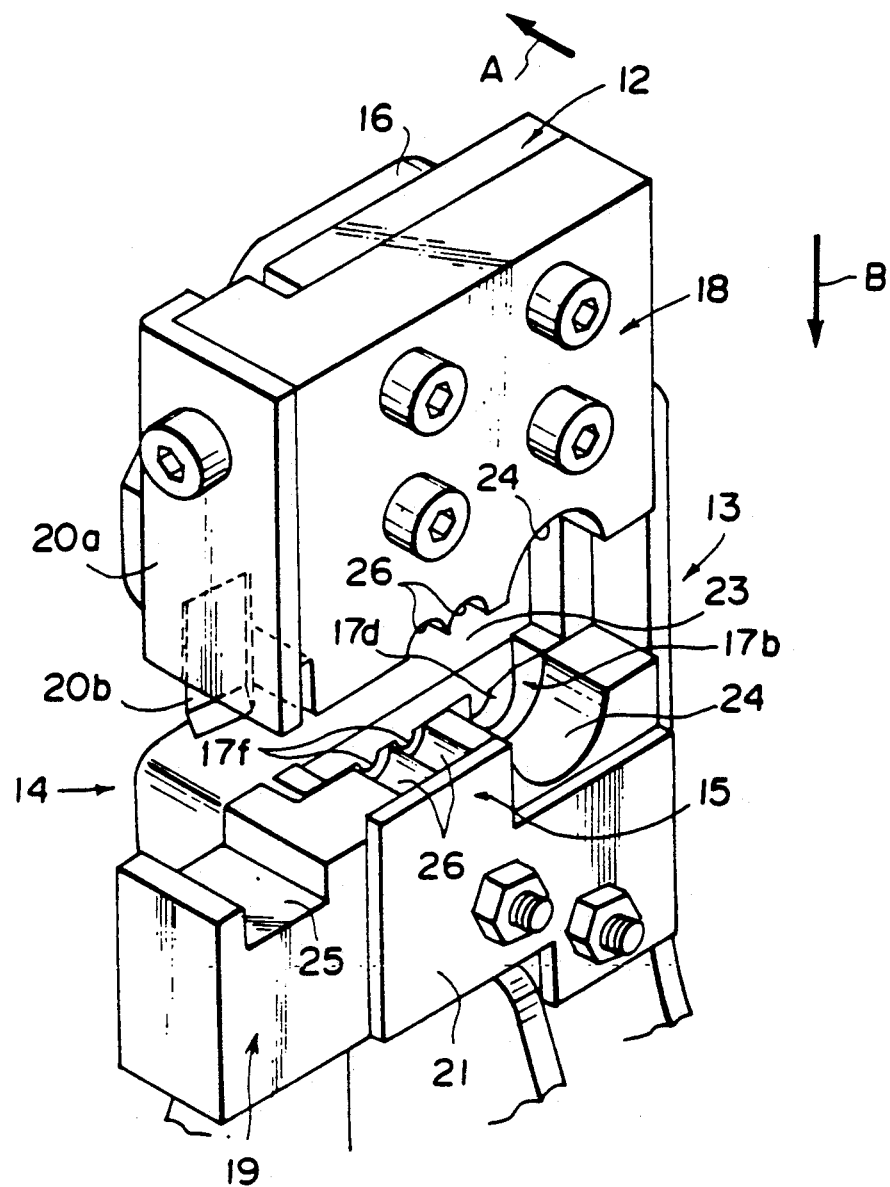
FIG. 3 is a perspective view of an important part of FIG. 1.
Figure 4:
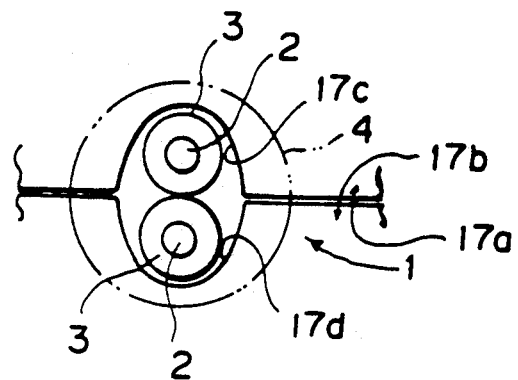
FIG. 4 is a simplified view illustrating stripping of the outer jacket of an optical fiber cable.

As illustrated in FIG. 3, the outer jacket stripping section 13 is constructed in such a way that the cutter sections 17c, 17d cut into the outer jacket 4 at the end 5 of the optical fiber cable 1 inserted in the opening 23. The optical fiber cable 1 is visually placed such that the two optical fibers 2 remain within $+10°$ of the plane that extends through the center of the vertically-aligned guides 24 in the opening 23 in FIG. 3. The pair of guides 24 that receive the end 5 of the optical fiber cable 1 are formed at opposite locations of the upper guide member 18 and the lower guide member 19. The guides 24 are arcuate surfaces having a radius of curvature corresponding to the external configuration of the optical fiber cable 1 with the optical fibers aligned substantially vertically. The upper and lower cutting blades 17a, 17b are disposed at the cable insertion side (referred to as back side hereunder) of the guides 24. As shown in FIG. 4, substantially symmetrical arcuate cutter sections 17c, 17d having a radius of curvature to cut into the outer jacket 4 of the optical fiber cable 1 are disposed adjacent the guides 24.

The aforementioned optical fiber separation section 14 is disposed in the lower guide member 19 at the other side of the guides 24. The optical fiber separation section 14 comprises a channel 25 in guide member 19 to guide the two optical fibers 2 to a predetermined position and a cutting blade 20b positioned above the channel 25. The cutting blade 20b is mounted by the support 20a at the side of the upper guide member 18 opposite the guides 24. The blade section of the cutting blade 20b is oriented relative to the longitudinal direction of the optical fiber cable 1 disposed in the channel 25 and moves up and down with the upper guide member 18.

Figure 5:
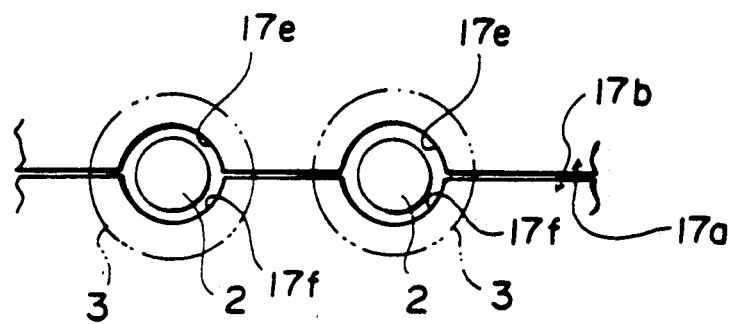
FIG. 5 is a simplified view illustrating stripping of the inner jackets of an optical fiber cable.

On the other hand, the inner jackets stripping section 15 is constructed such that the upper and lower cutter sections 17e, 17f cut the inner jackets 3 of the optical fibers 2 at a predetermined position Here, the optical fibers 2 separated by the optical fiber separation section 14 are positioned in the opening 23 for stripping the ends 3b of the inner jackets 3. Guides 26 are provided for proper positioning of the ends of the inner-jacketed optical fibers 2 inserted in the opening 23. The guides 26 include two arcuate channels, each having a radius of curvature equal to that of the jackets 3 of the optical fibers 2, at opposite locations of the upper and lower guide members 18, 19. As illustrated in FIG. 5, disposed at the back side of the guides 26 are upper and lower cutting blades 17a, 17b having arcuate cutter sections 17e, 17f capable of cutting the inner jackets 3 of the optical fibers 2 in the guides 26 without scratching the optical fibers 2. Also, the inner jacket stripping section 15 is provided with plate 21 positioned so that the ends of the two optical fibers 2 inserted in the guides 26 abut thereagainst for positioning the optical fibers 2 in their longitudinal direction. The stopper plate 21 is mounted on the lower guide member 19 in front of the guides 26.

The cable hold-down section 16 mounted on the rear side of the upper guide member 18 is constructed to hold down the section 6 of the cable inserted in the opening 23 adjacent end 5 thereof. That is, when the handles 11 are moved to a first position the upper guide member 18 and the cable hold-down section 16 move downwardly relative to section 16a and lower guide member 19, as indicated by an arrow B. The cable hold-down section 16 engages the cable at the section 6 behind the opening 23 while the upper and lower cutting blades 17a, 17b move relative to each other. By moving the handles 11 toward each other to a second position, the cable hold-down section 16 is moved so that the cable can be moved in the direction as indicated by an arrow A, relative to the cutting blades, thereby stripping the inner jackets 3 and the outer jacket 4.

In order to strip the outer jacket 4 of the optical fiber cable 1 at the end 5, the end 5 of the optical fiber cable 1 is first positioned in the guide 24 of the lower guide member 19 constituting the outer jacket stripping section 13 in the opening 23 of the optical fiber cable stripping tool 10 with the optical fibers 2 vertically aligned as mentioned above. As the handles 11 are moved, the cable hold-down section 16 and the upper guide member 18 move down as a unitary member in the direction indicated by the arrow B. The cable hold-down section 16 holds the section 6 of the cable and the arcuate cutter sections 17c, 17d of the upper and lower cutting blades 17a, 17b cut into the outer jacket 4 of the optical fiber cable 1 as illustrated in FIG. 4. It should be noted that the cutter sections 17c, 17d are properly designed not to scratch the inner jackets 3 of the optical fibers 2. When the upper and lower cutting blades 17a, 17b abut against each other, the cable hold-down sections 16, 16a starts to move backwardly while the cutter sections 17c, 17d remain in the outer jacket 4. Consequently, the outer jacket 4 at the end 5 of the optical fiber cable 1 between the upper and lower cutting blades 17a, 17b is separated and stripped by the outer jacket stripping section 15 when the cable is moved relative to the cutting blades or vice versa.

When operation of the handles 11 stops after completion of the above stripping operation, the handles 11 return to their initial positions, thereby restoring the opening 23.

Then, the two inner-jacketed optical fibers 2 with the outer jacket 4 stripped are separated by the optical fiber separation section 14. The ends of the inner-jacketed optical fibers are inserted in the channel 25 of the optical fiber separation section 14 before moving the handles 11 of the stripping tool 10. On moving the handles 11, the upper guide member 18 begins to move downwardly and simultaneously the cutting blade 20b cuts into the fused section 3a of the inner jackets 3 of the optical fibers 2. On pulling back the optical fiber cable 1 while the cutting blades 17a, 17b abut against each other and the handles 11 remain at an inner position, the fused section 3a of the optical fibers 2 is slit.

Subsequent to slitting the fused inner-jacketed optical fibers 2, the inner jackets 3 at the ends 3b are stripped by the inner jackets stripping section 14. For this end, inner-jacketed optical fibers 2 are placed in the guides 26 before moving the handles 11 of the stripping tool 10. The inner-jacketed optical fibers 2 are properly positioned by abutting their ends against the stopper plate 21. Under this condition, the handles 11 are moved thereby moving the cable hold-down section 16 and the upper guide member 18 having the cutting blade 17a downwardly in the direction as indicated by the arrow B. The cable hold-down section 16 holds the cable end section in position and the upper and lower cutting blades 17a, 17b having the arcuate cutter sections 17e, 17f cut into the inner jackets 3 of the optical fibers 2 as illustrated in FIG. 5. The cutter sections 17e, 17f are properly shaped not to scratch the optical fibers 2. When the upper and lower cutting blades 17a, 17b abut against each other, the cable hold-down section 16, 16a begins to move backwardly while the cutter sections 17e, 17f are maintained within the inner jackets 3, the cable and cutting blades are moved relative to each other which strips the inner jackets 3 at the ends 3b of the optical fibers 2 by the upper and lower cutting blades 17a, 17b.

For a complete understanding of the operating mechanism of tool 10, reference is made to U.S. Pat. No. 2,523,936.

The optical fiber cable stripping tool according to the present invention enables stripping the outer jacket at the end of an optical fiber cable by an outer jacket stripping section, separating longitudinally the inner-jacketed optical fibers at the stripped end of the optical fiber cable by a cutting blade and stripping the inner jackets at the ends of the separated inner-jacketed optical fibers by an inner jacket stripping section.

In other words, a single stripping tool is used to carry out the three operations in a sequential manner, thereby largely improving the efficiency of such operations.

What is claimed is:

1. A tool for stripping outer and inner jackets from a transmission cable, comprising:

upper and lower guide members normally spaced from one another defining an opening therebetween;

first and second guide means on said guide members;

operating means connected to said guide members to move them toward and away from one another;

cutting blade means mounted onto said guide members and having first and second cutting sections aligned respectively with said first and second guide means;

a support surface on one of said guide members and a cutting member on the other of said guide members in alignment with said support surface;

said first guide means accommodating an end of the outer jacket of the cable;

hold-down means positioned adjacent said cutting blade means for engaging and holding the cable when the guide members move toward each other causing the first cutting section to cut the outer jacket to the inner jacket whereby upon movement of the tool and cable relative to each other an end section of the outer jacket is stripped from the cable exposing an end section of fused inner jackets;

the exposed end fused inner jackets being slit add separated by said cutting member while being supported on said support surface; and said second guide means accommodating the separated ends of the inner jackets while said hold-down means engages the cable when the guide members move toward each other causing the second cutting section to cut the inner jackets to the transmission members whereby upon movement of the tool and cable relative to each other end sections of the inner jackets are stripped from the cable exposing the transmission members.

2. A tool as claimed in claim 1, wherein the operating means comprises handle means and spring means therebetween.

3. A tool as claimed in claim 1, wherein said support surface is on said lower guide member.

4. A tool as claimed in claim 1, wherein said cutting sections have arcuate configurations.

5. A tool as claimed in claim 1, wherein said guide means have arcuate configurations.

6. A tool as claimed in claim 1, wherein a stopper member is mounted on said lower guide member adjacent said second guide means so that end surfaces of the inner jackets and transmission members can abut thereagainst.

* * * * *

UNITED STATES PATENT OFFICE
CERTIFICATE OF CORRECTION

Patent No. 5,003,846  Dated April 2, 1991

Inventor(s) Hiroshi Yagawa

It is certified that error appears in the above-identified patent and that said Letters Patent is hereby corrected as shown below:

In claim 1, column 6, line 19, the word "add" should be --and--.

Signed and Sealed this

Twenty-seventh Day of October, 1992

Attest:

DOUGLAS B. COMER

*Attesting Officer*   *Acting Commissioner of Patents and Trademarks*